3,497,113
DISTRIBUTOR FOR FALLING GRANULAR MATERIAL

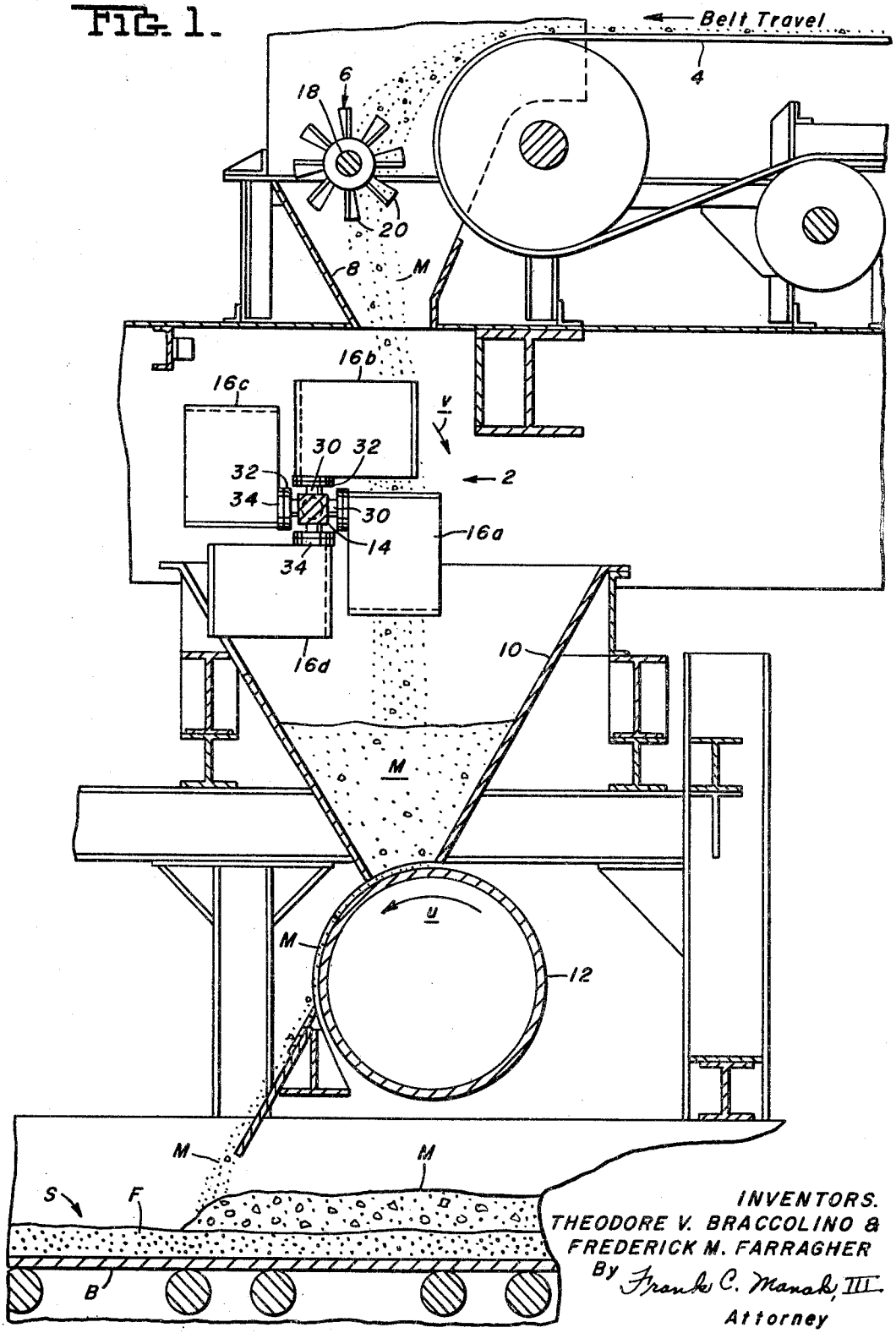

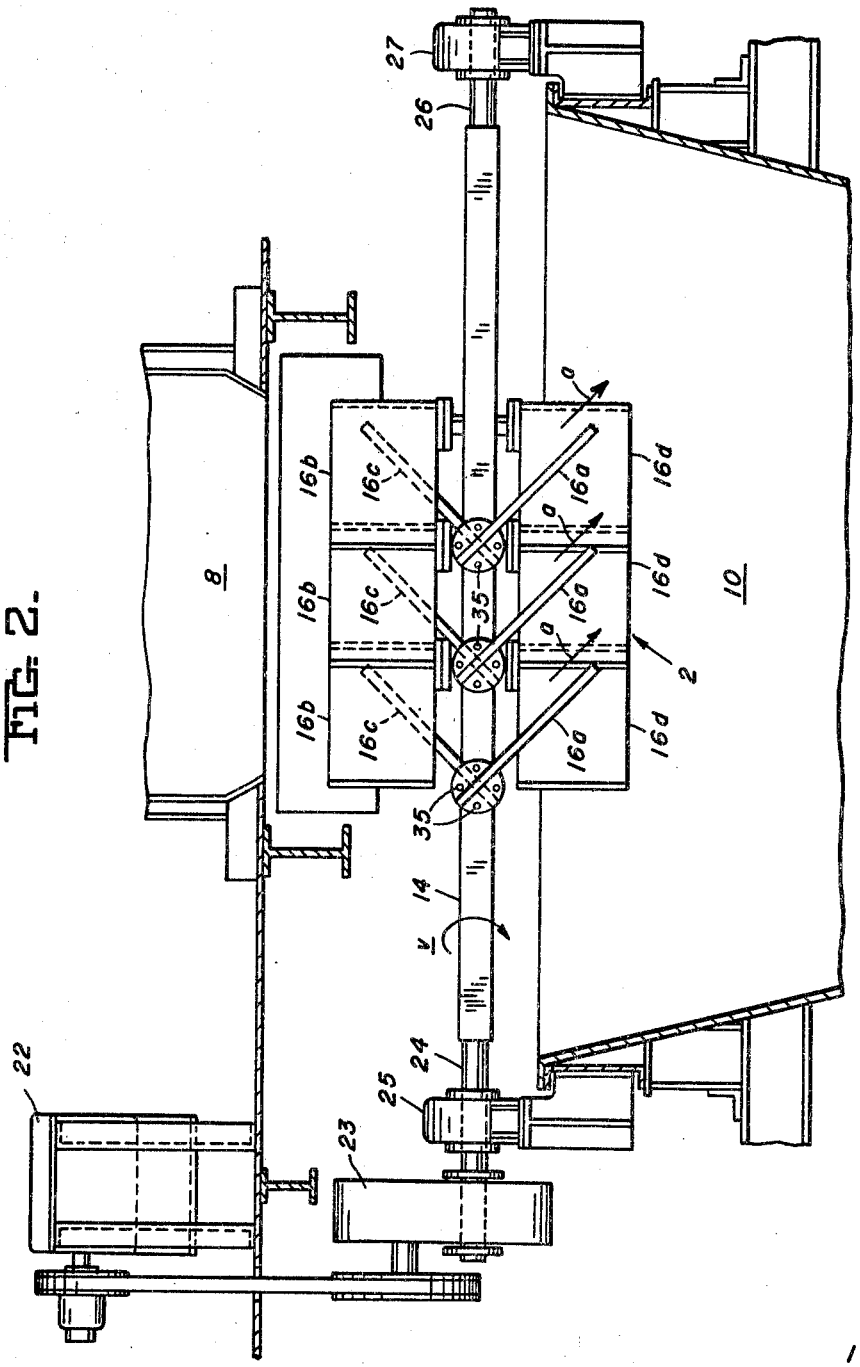

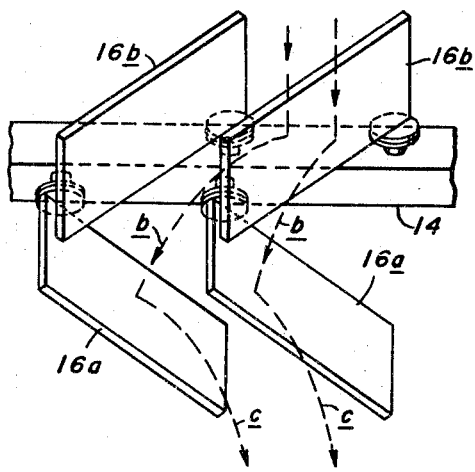
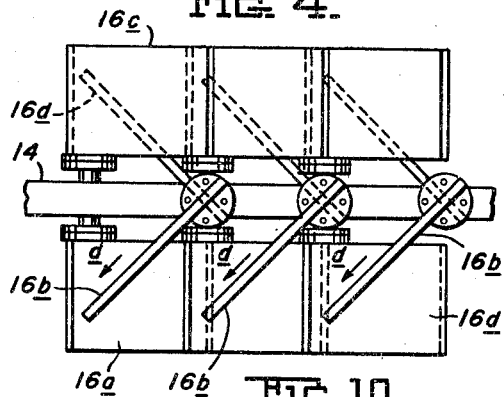
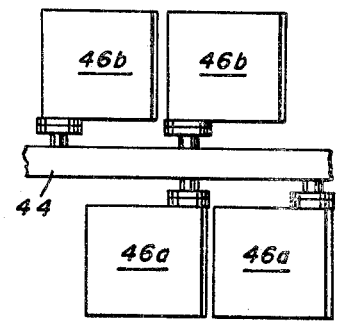
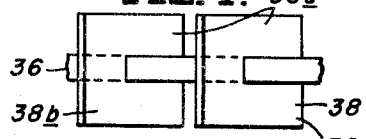
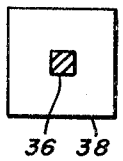
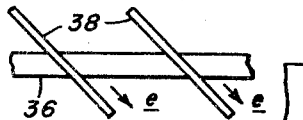
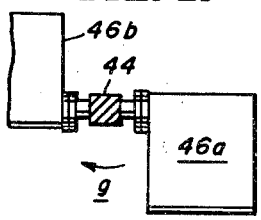
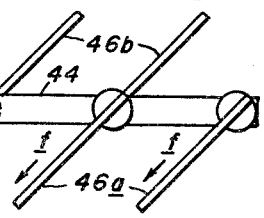
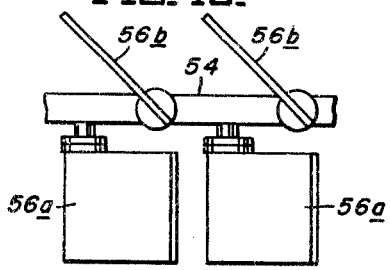
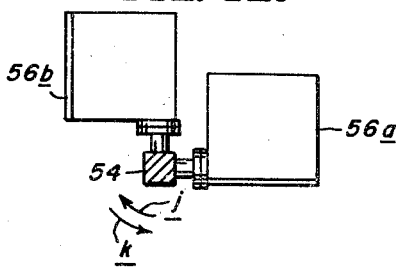
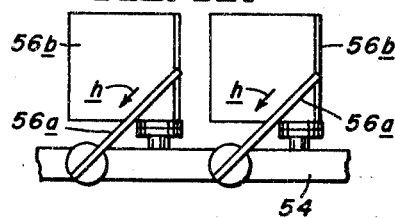
INVENTORS.
THEODORE V. BRACCOLINO &
FREDERICK M. FARRAGHER
By Frank C. Manak, III
Attorney

Theodore V. Braccolino, Campbell, and Frederick M. Farragher, Canfield Township, Mahoning County, Ohio, assignors to United States Steel Corporation, a corporation of Delaware
Filed Dec. 22, 1967, Ser. No. 692,768
Int. Cl. G01f 11/20
U.S. Cl. 222—227                                     9 Claims

ABSTRACT OF THE DISCLOSURE

A distributor for spreading a stream of falling granular material over an area wider than the original stream. The distributor includes a horizontal, rotatable shaft and rows of deflecting plates mounted along the length of the shaft. As the shaft is driven, a first row of plates enters the falling stream and deflects the granular material toward one end of the shaft. Then, a second row of plates enters the stream and deflects the material toward the other end of the shaft. The operation is then repeated over and over, with the material being deflected first in one direction, and then the other to create an even distribution of material over a wide area.

---

This invention relates to a device for distributing a stream of falling granular material over an area wider than the original stream. One of the uses of the invention is in the transfer of a mixture of iron ore, coke, limestone, and flue dust fines from a belt conveyor to the feed hopper of an iron ore sintering machine. The feed hopper is wider than the belt conveyor, and the distributor which we have invented receives the material falling from the belt conveyor and disperses it evenly across the feed hopper.

The conventional apparatus for distributing a falling stream of material across the feed hopper of a sintering machine comprises a short, secondary belt conveyor of approximately the same width as the falling stream. This secondary belt conveyor is mounted on a carriage beneath the end of the first-mentioned belt conveyor. The carriage swings about a vertical axis that is positioned where the stream of granular material would fall from the first conveyor. By means of a motor and appropriate limit switches, the short conveyor oscillates back and forth about its vertical axis between positions about 22½ degrees to either side of the center of the first belt conveyor. As the material falls off the discharging end of this swinging conveyor, it is distributed across the width of the feed hopper of the sintering machine.

The swinging conveyor has many disadvantages. The discharge end of the conveyor travels at a high, irregular rate of speed that results in a non-uniform distribution of particles across the hopper, and various portions of the material in the hopper becoming overly segregated or compacted. The material retains this uneven consistency when it reaches the sinter bed, and thus burns unevenly during the sintering process. Combustion air channels are formed in the bed in the areas of least resistance, and this causes a poor quality of sinter product.

In addition to giving unsatisfactory results, the swinging conveyor is difficult to maintain. The belt's short length makes it difficult to train and causes excessive flexing around the tail pulleys. This flexing, together with charring of the belt by hot sinter fines in the material mix, make it necessary to change the belt frequently. Furthermore, the motor driving the conveyor often fails due to severe service in a dusty atmosphere. Also, there are a large number of moving parts in the conveyor and in the hydraulic system and limit controls. All of these parts have a high maintenance cost.

Besides the above-described swinging conveyor, other distributing devices have been used such as swinging spouts, swinging chutes, and various short belt conveyors arranged in different ways. These devices have most of the objectionable features mentioned above, including the causing of a non-uniform distribution of particles in the sintering bed. Another problem inherent with all of these devices is the excessive spillage of material over the sides of the conveyor, spout, or chute, prior to the material reaching the feed hopper of the sintering machine.

An object of our invention is to provide a granular material distributor which is free of the maintenance problems of the prior devices mentioned above.

Another object is to provide a device for distributing a stream of falling granular material which spreads a substantially even amount of material across an area wider than the stream and leaves the material substantially free of areas of particle segregation and compaction.

Still another object of our invention is to provide a device that will distribute a stream of falling granular material across a hopper without substantial amounts of the material falling outside the hopper.

These and other objects will appear more readily from the following description of my invention and the attached drawings, in which:

FIGURES 1 and 2 are side and end views, respectively, of a granular material distributor and associated equipment, illustrating a preferred embodiment of our invention;

FIGURE 3 is a side view of a portion of the granular material distributor of FIGURE 1, showing the distributor in a different position from that of FIGURE 2;

FIGURE 4 is a side view of a portion of the granular material distributor of FIGURE 1, showing the distributor in another position from that of FIGURES 2 and 3;

FIGURES 5, 6 and 7 are side, end, and top views, respectively, of a second embodiment of our invention;

FIGURES 8, 9 and 10 are side, end and top views, respectively, of a third embodiment of our invention;

FIGURES 11, 12 and 13 are side, end and top views, respectively, of a fourth embodiment of our invention;

Figure 15:
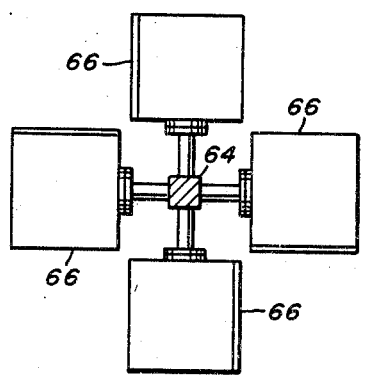
FIGURES 14 and 15 are side and end views, respectively, of a fifth embodiment of our invention.

FIGURES 1 and 2 show a granular material distributor 2 as it is used to feed material into an iron ore sintering machine. A stream of granular material M, comprising iron ore, coke, limestone and flue dust fines, falls off the end of a belt conveyor 4. The material M first passes through a conventional rotating fluffer 6 and then through a discharge chute 8. From there, it falls into the distributor 2, which feeds it evenly across the width of hopper 10 (FIGURE 2). Then, drum 12 (FIGURE 1) rotating in the direction of arrow $u$ at the bottom of hopper 10, feeds the material M at a controlled rate onto the sinter bed S, where it is deposited on top of a layer of sinter fines F travelling on a belt B.

The distributor 2 includes a rotatable shaft 14 of square cross-section and rows of plates 16a, 16b, 16c, and 16d mounted on the longitudinal walls of the shaft. The shaft 14 is designed to rotate slowly and thus carry the rows of plates 16a, 16b, 16c, and 16d gradually into and out of the path of material stream M. The plates 16 in all the rows are carefully spaced and aligned so that as shaft 14 rotates, they deflect the material first to one side of the hopper 10 and then gradually carry the stream back and forth across the hopper. Also, the plates 16 break the material stream M into smaller streams, which results in smaller variations in the level of material in hopper 10. This lessens the degree of particle compaction and segregation in the hopper 10.

The fluffer 6 is somewhat similar in appearance to the distributor 2, in that it also comprises a rotatable shaft to which blades or plates are attached. However, it has a structure, operation, and purpose that are substantially different from the distributor 2. The fluffer 6 comprises a shaft 18 and blades 20 that are randomly spaced and randomly oriented about the shaft. The speed of the shaft 18 is much faster than shaft 14 of distributor 2. As the material M passes through the rapidly moving, randomly oriented blades 20 of the fluffer 6, any compacted portions of material M are thoroughly broken up. This results in a substantially homogeneous consistency in the stream of material M as it falls into the distributor 2.

A requirement of the distributor 2 is that it distribute the material M across the hopper 10 in such a manner that the homogeneous consistency provided by the fluffer 6 is not destroyed. If the material M on the sintering bed has portions which are more compacted than others, it will burn unevenly during the sintering process and the resulting sinter product will be of low quality.

As shown in FIGURES 1 and 2, there are four rows of plates 16a, 16b, 16c, and 16d on the shaft 14 of distributor 2. The shaft 14 is in a position such that plates 16a are in the path of material M falling from chute 8. As FIGURE 2 shows, plates 16a are sloped at an angle of 45° to the vertical and extend downwardly toward the right end of shaft 14. The material stream M is thus deflected toward the right end of feed hopper 10, as indicated by arrows a.

The shaft 14 is turned slowly, clockwise as viewed in FIGURE 1 (arrow v) by an electric motor 22 (FIGURE 2) that operates through a gear reducer 23 connected to the shaft 14. The recommended speed of shaft 14 is about 10 revolutions per minute. As the shaft 14 turns, plates 16a are slowly carried downward and away from the path of material M, and plates 16b are carried into the path of material M. The plates 16b are sloped toward the opposite end of shaft 14 from plates 16a. As shown in FIGURE 3, when rows of plates 16a and 16b are each partially in the path of the material stream, the material is deflected first to the left by plates 16b (arrows b) and then to the right by plates 16a (arrows c). When the shaft 14 has rotated 45° from its position shown in FIGURE 1, the deflections of the plates 16a and 16b will cancel each other, and the material M will fall into the center of hopper 10.

FIGURE 4 shows the shaft 14 rotates 90° from its position of FIGURE 1, and thus plates 16b are the only plates deflecting the stream M. The plates 16b are sloped at a 45° angle to the vertical, in a direction that is downward and toward the left end of shaft 14. Thus, the material M is deflected in the direction of arrows d so as to land in the left end of hopper 10.

During the continuous rotation of the shaft 14, the material stream M is first deflected by plates 16a to the right and then is gradually carried across the hopper to the left until plates 16b are fully in the path of the material M. Then, plates 16c gradually cause the stream M to be carried back to the right. Plates 16d carry the stream M again to the left, and plates 16a then return to carry the stream back to the right end of hopper 10. Thus, the stream M is carried back and forth across the hopper 10 twice in each revolution of shaft 14. At a speed of 10 revolutions per minute, the shaft 14 would cause the stream M to be alternated back and forth across the hopper 10 at the rate of 20 times per minute in each direction.

The shaft 14 has a circular bearing portion 24 on its left end (FIGURE 2) that is held rotatably in a fixed pillow block 25, and a similar bearing portion 26 on the right end held in a floating pillow block 27. Between the pillow blocks, the shaft 14 is preferably of square cross section, as shown in FIGURES 1 and 2. Short rods 30 with circular flanges 32 are welded to each side of the shaft 14 at places where the plates 16 are to be connected (FIGURE 1). The plates 16 have welded to them flanges 34 similar to flanges 32, and the plates are connected to the shaft 14 by bolting the flanges 32 to the flanges 34 with bolts 35 (FIGURE 2). The bolt holes in flanges 32 are preferably in the form of arcuate slots so that the angle of plates 16 can be adjusted. Changing the angle of plates 16 causes the material M to be deflected over either a wider or a more narrow area.

The plates for deflecting the material M may be mounted and arranged on the shaft 14 in a variety of ways while remaining within the scope of our invention. For instance, as shown in FIGURES 5, 6 and 7, plates 38 are mounted with shaft 36 extending through their centers. The shaft 36 is positioned so that material falls on both sides of the shaft, and is defletced by both halves 38a and 38b of plates 38. In the position shown in FIGURE 5, the plates 38 deflect the material to the right (arrows e). As the shaft is turned the plates 38 gradually become perpendicular to the stream M and allow the stream to fall downward without being deflected. Then, the plates 38 are gradually turned over to a position 180° from their position shown in FIGURE 5, and they deflect the stream toward the left end of the shaft 14. With each revolution of the shaft 36, the material is carried back and forth across the hopper once, instead of twice as with the embodiment shown in FIGURES 1–4.

FIGURES 8, 9, and 10 show a shaft 44 with plates 46a and 46b mounted on opposite sides thereof. Material M strikes plates on only one side of shaft 44, and plates 46a are initially in the path of the material. The plates 46a deflect the material to the left, as viewed in FIGURE 8 (arrows f). Then, as shaft 44 is rotated in the direction of arrow g (FIGURE 9), plates 46a deflect the material stream M less and less, until all the plates 46a and 46b are perpendicular to the stream, allowing the material to fall directly into the center of the hopper. Gradually, the plates 46b are carried into the stream and deflect the material to the right, as viewed in FIGURE 8. As with the previous embodiment (FIGURES 5, 6 and 7) the material is carried back and forth across the hopper once during each revolution of shaft 44.

FIGURES 11, 12 and 13 show still another embodiment of our invention. Shaft 54 carries rows of plates 56a and 56b, one row being mounted on the shaft at positions 90° from where the other row is mounted. Initially, plates 56a are in the path of the material stream. As shown in FIGURE 11, the material stream is first deflected to the left (arrows h) by plates 56a, and then, as shaft 54 is turned clockwise (arrow j), the material is carried to the right as plates 56b enter the path of the stream. When the shaft 54 has been rotated 90° from position shown in FIGURES 11–13, so that plates 56b are fully within the path of stream, the direction of the shaft rotation is reversed, as indicated by arrow k, and the material stream is carried back to the left by plates 56a coming back into the path of the stream.

Figure 14:
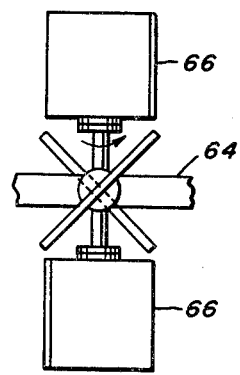

FIGURES 14 and 15 show an embodiment of our invention that is very similar to the first embodiment of FIGURES 1 through 4. Four rows of plates 66 are mounted around a shaft 64 in the same orientations as the plates 16 mounted around shaft 14, except that each plate 66 is connected to the shaft 64 at a point in the middle of one edge of the plate, instead of at one of the corners. To prevent the plates 66 of one row from interfering with plates of another row, long rods 68 are used to connect the plates to the shaft 64.

Figure 16:
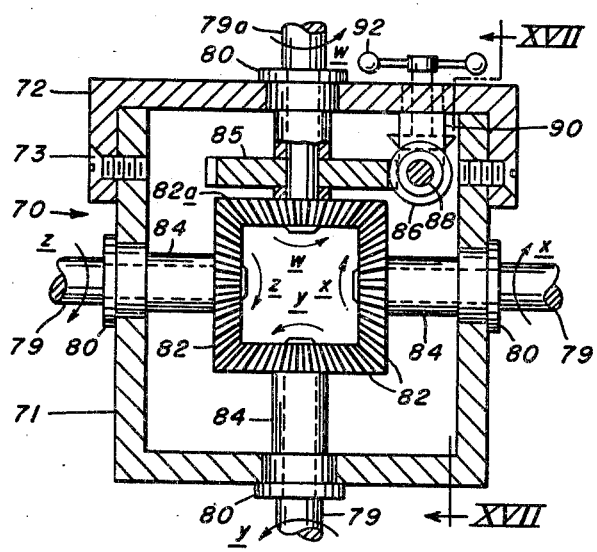
FIGURE 16 is an enlarged cross-sectional view of a granular material distributor, showing a blade adjustment means which may be used with any of the foregoing embodiments.

FIGURE 16 shows a cross section of the shaft of a granular material distributor, embodying a special means for adjusting the angles of the deflecting plates 16 (FIGURES 1–4) or the plates of any of the other embodiments (FIGURES 5–15). The solid shaft 14 of FIGURES 1-4 is replaced by a rectangular, hollow shaft 70, which includes a three-walled structural member 71 and a removable cover plate 72 which forms the fourth wall of the shaft. The cover plate 72 is secured to the three-walled member 71 by a plurality of machine screws 73 spaced along the length of the shaft 70. The cover plate 72 is made removable only to facilitate the assembly and maintenance of the machinery inside the shaft 70.

Figure 17:
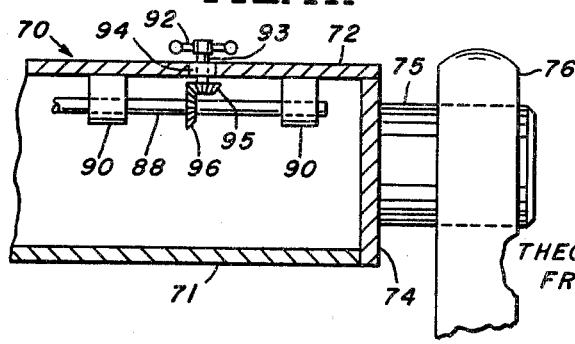
FIGURE 17 is a longitudinal section of an end portion of the granular material distributor of FIGURE 16, taken along lines XVII—XVII of FIGURE 16.

One end of shaft 70 is shown in longitudinal section in FIGURE 17. An end plate 74 is welded to the three-walled member 71, and a solid, round shaft piece 75 is in turn welded to the end plate 74. The shaft piece 75 rotates in pillow block 76. The other end of the shaft 70 has the same construction, except that it is attached to a drive means.

The deflecting plates of the other embodiments are connected to the central shaft 70 by short shafts 79 and 79a, which are similar in function to the short rods 30 (FIGURE 1), but which differ from the rods 30 in that they are rotatably supported in bearings 80 mounted in the walls of the hollow shaft 70. Also, inside the walls of hollow shaft 70, each short shaft 79 or 79a is equipped with a bevel gear 82 or 82a. All of the bevel gears 82 and 82a are of the same diameter and have sleeves 84 to space the gears at distances from the walls of hollow shaft 70 such that each gear will mesh with the two adjacent bevel gears 82 or 82a. The bevel gear 82a serves as the drive gear, and when this gear is rotated with its short shaft 79a in the direction indicated by arrow w, each of the other gears 82 and their shafts 79 are rotated in the directions indicated by arrows x, y, and z. It should be noted that these rotations will bring the deflecting plates connected to the shafts 79 to positions either more parallel or more perpendicular to the central shaft 70. Also, since bevel gears 82 are of the same diameter, each deflecting plate is rotated exactly the same number of degrees as the others.

In order to drive the bevel gear 82a, a worm wheel 85 is mounted above the gear 82a on the shaft 79a. A worm 86, mounted on shaft 88, is rotated to drive the worm wheel 85, or when the worm 86 is not rotating, it holds the worm wheel and connected gears 82 in their desired positions.

In addition to the worm 86, the shaft 88 carries other worms along its length for rotating other sets of deflecting plates, not shown in FIGURE 16. The shaft 88 extends lengthwise along the inside of hollow shaft 70 and is held rotatably in bearing supports 90 suspended from cover plate 72.

FIGURE 17 shows a longitudinal section of one end of shaft 70 with the shaft 88 supported inside it. A hand wheel 92 is used to turn the shaft 88, and is connected to a shaft 93 mounted rotatably in a bearing 94 in the cover plate 72. Bevel gear 95 on shaft 93 meshes with bevel gear 96 on shaft 88 to provide the desired drive connection between hand wheel 92 and the shaft 88.

If it is desired that the angles of the deflection plates be adjustable by remote control, an electric motor may be mounted on cover plate 76 and connected to shaft 93, in place of hand wheel 92. Such a motor would enable the operator to adjust the deflecting plates while the shaft 70 is rotating in a stream of granular material.

While several embodiments of our invention have been shown and described, other modifications will of course be apparent.

We claim:
1. The combination, with means for feeding a stream of granular material in a free-falling downward path, and a receiver of greater width than said feeding means spaced therebelow, of a distributor for spreading the material across the width of said receiver in part to regions of the receiver which lie outside the downward projections of both sides of said feeding means, said distributor comprising:
   a shaft journaled on a horizontal axis in the space between said feeding means and said receiver;
   drive means operatively connected with said shaft for turning it on its axis; and
   at least one plate carried by said shaft and providing deflecting surfaces which move into and out of the path of the stream as the shaft turns;
   one of said surfaces being inclined to the vertical as it moves within the path of the stream in a direction to deflect material toward one end of the shaft;
   an immediately following one of said surfaces being oppositely inclined to deflect material toward the other end of the shaft;
   said surfaces allowing material to pass without deflection during intervals when neither is in the path of the stream.

2. A distributor as defined in claim 1 in which said shaft is horizontally offset from the path of the stream and the plates are spaced at substantially 90° angles from the plates immediately preceding and following, the deflecting surfaces of each plate being inclined oppositely to those of the plates immediately preceding and following.

3. A distributor as defined in claim 2 comprising in addition means for adjusting the position of said plates with respect to said shaft to vary the angles of inclination of said deflecting surfaces.

4. A distributor as defined in claim 3 in which the adjusting means for each plate includes a respective flange extending from said shaft and lying in a plane substantially parallel with the axis of said shaft, a respective flange extending from the plate and lying in a plane substantially perpendicular to the plate, each of said flanges having bolt holes therein, the holes in one flange being in the form of arcuate slots which can be aligned with the holes in the other flange at a desired range of positions of inclination of the plate, and bolts extending through said holes to fix the plate to the shaft.

5. A distributor as defined in claim 3 in which the adjusting means for the plates includes respective rods extending from the plates and rotatably mounted on said shaft, and a worm and worm-wheel drive means operatively connected with said rods.

6. A distributor as defined in claim 5 in which the adjusting means for the plates includes in addition respective bevel gears mounted on each of said rods and meshing with adjacent bevel gears on other rods so that all said gears and rods turn together when adjustments are made.

7. A distributor as defined in claim 1 in which at least one of the first-named deflecting surfaces and at least one of the following deflecting surfaces are formed on a single plate, said shaft extending through the central portions of said plate.

8. A distributor as defined in claim 1 in which said shaft rotates continuously in one direction.

9. A distributor as defined in claim 1 in which said shaft is horizontally offset from the path of the stream and there are at least two plates spaced approximately 90° apart, the deflecting surface of each of said plates being inclined oppositely to that of the other, said shaft oscillating as it turns.

References Cited

UNITED STATES PATENTS

| | | | |
|---|---|---|---|
| 2,632,584 | 3/1953 | Zuber | 222—238 |
| 2,696,331 | 12/1954 | Fahrni | 222—227 |
| 2,822,934 | 2/1958 | Bartelt | 222—236 X |
| 3,070,261 | 12/1962 | Smalley | 222—238 X |

SAMUEL F. COLEMAN, Primary Examiner

H. S. LANE, Assistant Examiner

U.S. Cl. X.R.

214—17; 222—410